United States Patent [19]

Gonzi

[11] Patent Number: 4,658,856

[45] Date of Patent: Apr. 21, 1987

[54] MICROLEAKS INTERCEPTING APPARATUS FOR AVOIDING AND/OR SIGNALLING OIL LEAKAGES IN HYDRAULIC PLANTS AND FOR EQUIVALENT USES

[76] Inventor: Mario Gonzi, Via Montarfoni, 65, Ponticino, Laterina, Arezzo, Italy, 52020

[21] Appl. No.: 741,228

[22] Filed: Jun. 4, 1985

[30] Foreign Application Priority Data

Jun. 8, 1984 [IT] Italy ................................. 9428 A/84

[51] Int. Cl.⁴ ............................................. F16K 17/24
[52] U.S. Cl. ............................. 137/543.23; 137/493.8; 137/554
[58] Field of Search ................ 137/493.8, 540, 543.23, 137/554; 251/120, 121

[56] References Cited

U.S. PATENT DOCUMENTS

| | | | |
|---|---|---|---|
| 2,873,760 | 2/1959 | Safford | 137/543.23 |
| 3,756,273 | 9/1973 | Hengesbach | 137/540 |
| 4,195,552 | 4/1980 | Neff | 137/493.8 |
| 4,326,558 | 4/1982 | Gage | 137/554 |
| 4,350,176 | 9/1982 | Lace | 137/554 |
| 4,356,997 | 11/1982 | Beffano | 251/121 |
| 4,376,450 | 3/1983 | Fayfield et al. | 137/554 |
| 4,541,455 | 9/1985 | Hauser | 137/540 |

Primary Examiner—Martin P. Schwadron
Assistant Examiner—Sheri M. Novack
Attorney, Agent, or Firm—Hopgood, Calimafde, Kalil, Blaustein & Judlowe

[57] ABSTRACT

A unidirectional valve (7) forms a reduced meatus which extends in the direction of the obturator (23) movement, which meatus is to be passed through by possible microleaks in case of losses in the actuator branch (3); a considerable run of the obturator (23) in the presence of microleaks and of consequent pressure losses is thus obtained; a sensor (47) detects the obturator displacements.

5 Claims, 4 Drawing Figures

MICROLEAKS INTERCEPTING APPARATUS FOR AVOIDING AND/OR SIGNALLING OIL LEAKAGES IN HYDRAULIC PLANTS AND FOR EQUIVALENT USESDESCRIPTION

After the travel of an oleodynamic actuator has taken place, while the thrust of the liquid under pressure is still operating, no transfer of liquid from the distributor to the actuator must occur. Should this transfer of liquid actually occur under the above stated conditions, it would mean either a breaking of the actuator gaskets or some leakages from pipes (rigid or flexible). Referring in particular to leakages from pipes, a concentration of the dispersed liquid may occur which often represents a heavy risk of fire in a more or less exasperated way depending on the circumstances into which these leakages take place. In such environments like those where spot or seam welder, machines for plastic materials, textile machines are located, or in foundries, etc., troubles like those above described may reach the outmost risk level. Under these circumstances the interception and signaling of even microleaks is essential in order to promptly intervene and carry out suitable service operations, or to dieactivate the plant when such leakages can be dangerous to the prosecution of the working cycle.

The apparatus of the invention serves to fulfill the previously stated purposes. This apparatus substantially comprises: a unidirectional valve forming a reduced meatus (flow passage) which extends in the direction of the obturator movement, which meatus is to be passed through by eventual microleaks, in case of leakages in the actuator branch, thus obtaining a noticeable travel of the obturator in the presence of microleaks and consequent losses of pressure; and a sensor which detects the obturator displacements.

The apparatus may comprise two oppositely directed paths in parallel towards and from the actuator branch, with respective obturators; in one of the two paths, the unidirectional valve with the meatus is located, which valve permits the flow towards the actuator branch.

Practically, the above sensor may be an axial proximity sensor.

The meatus may be formed by a thin hollow space and/or labyrinth means between the mobile part and the fixed part of the unidirectional valve, which develop along a wide excursion of the mobile part starting from the operative seat formed in the fixed part.

The apparatus may include a spring acting on the mobile part of the valve to urge it to the closure position, and a possible small spring which tends to act in the opposite direction, in order to axially urge a detection means against said mobile part and to axially urge it away from a proximity sensor.

Said spring—the one acting on the mobile body of the valve—can be adjusted to calibrate the intervention sensitivity.

The invention will be better understood by a reading of the following description and the accompanying drawing, which shows a practical, non limitative exemplification of the invention itself. In the drawing.

Figure 1:
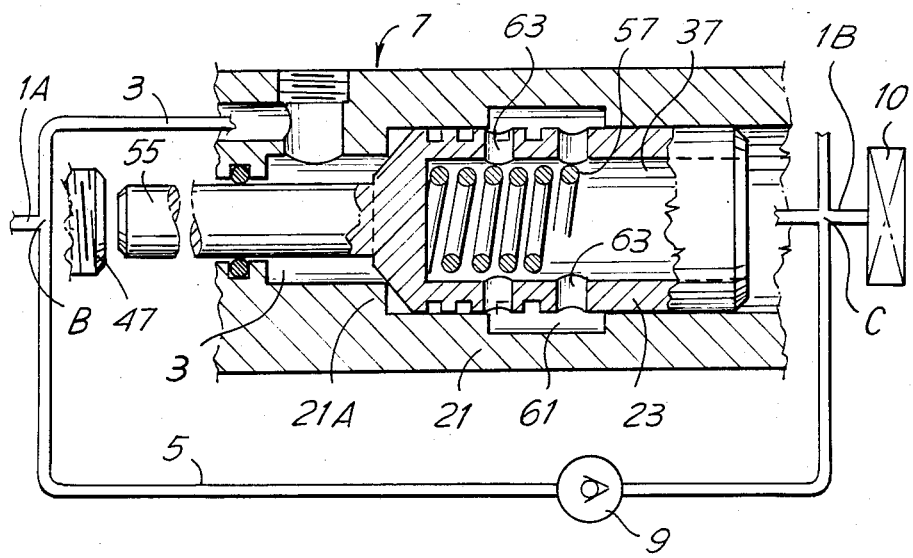
FIGS. 1 and 2 show an operating diagram in a dynamic control arrangement and no leaks.
Figure 2:
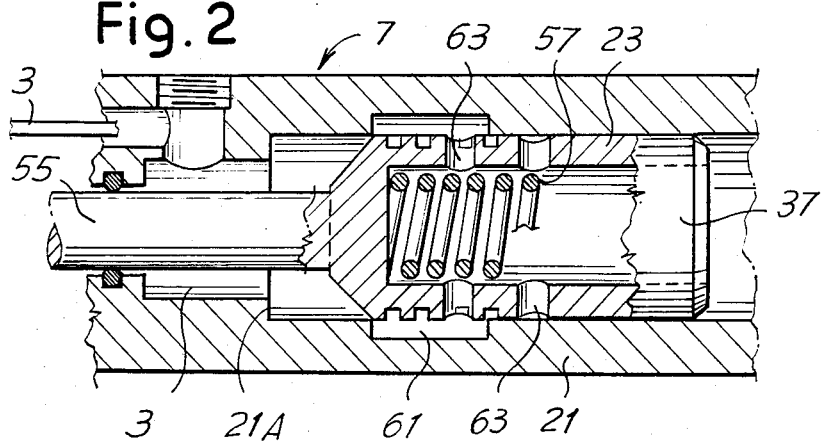

As a first approximation, FIGS. 1 and 2 show a flow passage 1A which, at a point B, divides into two branches 3 and 5 which rejoin at C into the branch 1B, a respective unidirectional valve 7 and 9 being interposed in each of said branches 3 and 5. The branch 3 is for feeding the actuator 10 which must be maintained under pressure and whose leakages must be signalled. To this purpose, it is necessary to keep the flow through 3 under control, through the valve 7. Accordingly, the unidirectional valve 7 of the branch 3—that is run by said flow—will be of special shape since, besides performing the function of unidirectional controlling valve to the actuator 10, it must act as an interceptor of microleaks through it, in a direction concordant with its nominal control flow.

The function of the apparatus is not that of revealing analogue functions—although they could be revealed by adopting a different position sensor—but rather to detect the presence on the duct 3 of micro-leaks of a higher degree than the calibration threshold which has been previously predetermined in it.

In order to make this phenomenon palpable, i.e. evident, an obturator has been devised with such a configuration as to magnify the leaks collateral effects, that is, down stream of the obturator seat. The solution consists in forcing the leaks to filter through a very restricted meatus between the obturator point and the collecting annular chamber, towards the obturator. The very extended recovering, i.e. superimposing, zone of the obturator on its cylindrical seat, combined with the labyrinth-like seal and the very small matching clearance, magnify the apparatus sensitivity.

The flow of the leaks to be signalled is forced to go through the above described narrow meatus, thus causing a slight drop of pressure from upstream to downstream of the obturator. The above drop of pressure causes the displacement of the obturator of some millimeters along its axis. This displacement is detected by the electronic-inductive proximity sensor, whose ON/-OFF signal, processed by the electric/electronic equipment, permits to be informed of the presence of the leaks.

Obviously, all the liquid passes through the obturator 7 during the actuator movement, in the situation shown in FIG. 2. Accordingly, in this transition phase, the electronic-inductive proximity sensor becomes activated since the obturator is completely open. The electric/electronic equipment will perform the suitable masking of the signal during the entire transition phase of the actuator movement, in order not to associate it with a leak.

Figure 3:
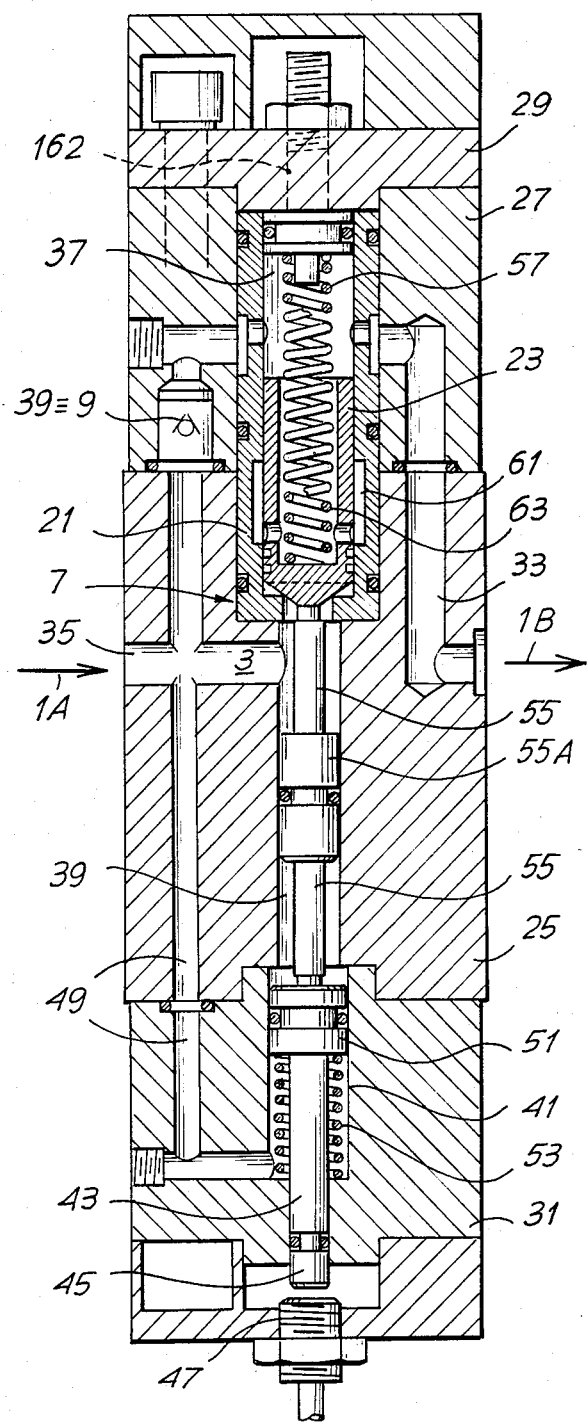
FIGS. 3 and 4 show two examples of embodiment in more detail.

FIG. 3 shows a more detailed embodiment of a valve provided with a sensor capable of detecting an axial movement.

Referring to FIGS. 1, 2 and/or 3, numeral 21 indicates the cylindrical body of the valve 7 forming the seat 21A of the same valve. Numeral 23 indicates the mobile body of the valve 7, whose frusto-conical end surface co-acts on the seat 21A thus defining the closure. The valve is fully housed in a body 25, 27, 29, 31, in the inside of which a passage 33, connected to the actuator and to the piping, of which a possible leakage flow must be signalled is formed. Numeral 35 indicates the duct which delivers the fluid. The outlet due to the reverse travel of the obturator, takes place through the rear cavity 37 of the cylindrical body 21; numeral 39 (corresponding to 9) indicates the valve on the outlet branch from the actuator (branch 5). An axial cavity 40, 41 extends from the seat 21A of the valve up to a passage 43 for a stem 45 which results with its end external respect to the cavity being invaded by the fluid and in a position facing the proximity sensor 47. An offtake 49 from the duct 3 reaches the cavity 41 to perform a thrust on the active section of a piston 51 travelling in the cavity 41 and subjected to the action of a small spring 53 which ensures a slight thrust of the stem 45 of the piston 51 and of a tappet stem 55 resting against the mobile part 23 of the valve. The piston 51 balances the thrust received by the piston-like part 55A of the stem 55 in opposite direction, so that the equipment of stem 55 and of stem 43 is balanced respect to the liquid pressure, apart from the slight thrust obtained by the small spring 53. The action of the small spring 53 is very slight and less than that of a spring 57 which urges the mobile part 23 of the valve towards the seat 21A.

The arrangement described above with reference to FIG. 3 can be seen in larger dimensions and simplified in the diagram of FIGS. 1 and 2, in which the components 21, 21A, 23, 47, 55, 57 are indicated all the same.

An elongated hollow space making up a leak meatus extends from and is defined by the cylinder 21 and the body 23, between the frusto-conical part of the body 23 and an annular manifold 61 for delivery (to the actuator) cut out inside the cylinder 21; this manifold 61, through passages 63, is put into communication with the branch 33 for the fluid and thus with the actuator, through an axial space in the body 23 for the spring 57.

When a leakage of fluid and thus a drop of pressure in the branch of the hydraulic circuit towards the actuator take place, a limited opening of the valve 21A, 23 occurs and a leak takes place in the meatus defined by the cylinder 21 and the body 23, thereby determining a higher drop of pressure and thus a magnified opening travel of the obturator body 23. Consequently, a withdrawal of the end of stem 45 from the sensor 47 occurs, which sensor detects this withdrawal causing the signalling or the required operation. The full opening of the valve 21A, 23 takes place in the arrangement shown in FIG. 2 owing to the transient working of the actuator.

The meatus between the components 21 and 23 may be realized like a simple hollow space obtained by precise machining operations of the cylindrical surfaces and/or by formation of labyrinths and/or by other per se known technical means.

Figure 4:
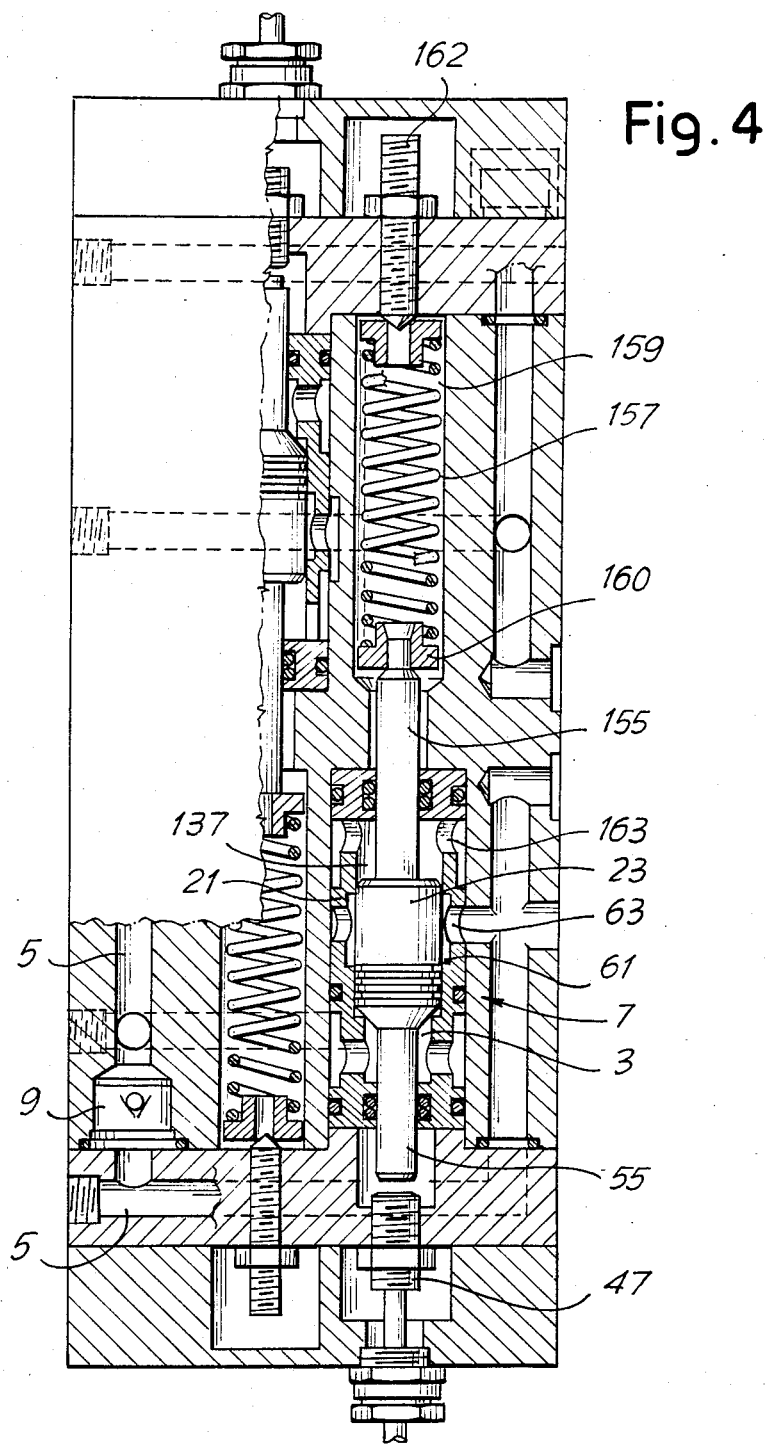

In FIG. 4 the members corresponding to those of the previous examples are indicated by the same references. In this example, the stem 55 acts directly on the sensor 47. The valve body 23 is subject to a downstream counter-pressure, through passage 63 and 61 and a passage 163, which reaches the chamber 137. The body 23 has a further stem 155 equal and opposite to that indicated by 55. This stem comes out in a sealing condition to reach a cavity 159 where a spring 157 is housed, similar to that indicated by 57; said spring reacts with an abutment ring or round plate 160 on the stem 155 and with an abutment ring or round plate 160A on an adjusting screw 162.

The spring 57 or 157 is pre-loaded to compensate for and overcome the frictions on the seals. In the presence of loosenings and leakage in the seals, it is possible to intervene by increasing the spring pre-load, for example, by operating on the screw 162. Practically, the spring pre-load variation permits a calibration of the intervention sensitivity.

The present apparatus offers a high sensitivity of the obturator even in presence of limited leaks. It is capable of intercepting microleaks by a reading threshold suitably predisposed by means of a predetermined calibration even when the component is worn out. The apparatus allows a signalling by means of an ON/OFF contact in output to cause the intervention of the electric/electronic control. The efficiency and sensitivity are independent of the operating pressure.

Possible specific applications are, among many others: in the oleodynamic pumping small stations or boards for all those movements where the leaks are likely to cause pollution or risk of fire; in obturators for controlling welding clamps; in control means for actuators lying in the vicinity of heat sources or materials which can be polluted.

It should be understood that the drawing shows one exemplification given only as a practical demonstration of the invention, as same invention may vary in the forms and dispositions without, nevertheless, coming out from the scope of the idea on which the invention is based.

I claim:

1. A leak detecting check valve comprising in combination a valve body containing a fluid passage therethrough from an inlet port to an outlet port, a moveable valve member disposed within said fluid passage, a valve seat within said fluid passage engageable by said valve member for closing said fluid passage, said fluid passage and said valve member being constructed to permit travel of said valve member from a first position in engagement with said valve seat to a second position at which said fluid passage is open to a maximum, said fluid passage being further constructed in combination with said valve member to provide restricted opening of said passage over a substantial travel of said valve member from said first position toward said second position, said fluid passage having a circular cylindrical region adjacent said valve seat, and said valve member having a circular cylindrical portion that travels within said cylindrical passage region concentric therewith with a narrow radial clearance therebetween providing said restricted opening of said passage, said cylindrical portion of said valve member having an end for engaging said valve seat and being disposed to travel away from said valve seat towards said second position, sensor means for detecting when said valve member approaches said second position, and spring biasing means coupled to said valve member for urging the latter toward said valve seat, whereby leaks in any fluid circuit coupled to said outlet port which leaks exceed the flow capacity through said restricted opening will cause said valve member to move toward said second position and activate said sensor means.

2. A leak detecting check valve according to claim 1, wherein a follower member is disposed in coaxial relationship to said valve member in a passage in said valve body located on the opposite side of said valve seat from said valve member, said follower member having a leading end that is constructed to engage said valve member through said valve seat, said follower member having a trailing end that is opposite said leading end which trailing end is positionable toward and away from said sensor means, and a second spring biasing means coupled between said valve body and said follower member for urging the latter against said valve member, said second spring biasing means having a smaller spring constant than said first biasing means.

3. A leak detecting check valve according to claim 2, wherein means are provided for adjustably preloading said first spring biasing means.

4. A leak detecting check valve according to claim 2, wherein said sensor means comprises an axial proximity sensor.

5. A leak detecting check valve comprising in combination a valve body containing a fluid passage therethrough from an inlet port to an outlet port, a moveable valve member disposed within said fluid passage, a valve seat within said fluid passage engageable by said valve member for closing said fluid passage, said fluid passage and said valve member being constructed to permit travel of said valve member from a first position in engagement with said valve seat to a second position at which said fluid passage is open to a maximum, said fluid passage being further constructed in combination with said valve member to provide restricted opening of said passage over a substantial travel of said valve member from said first position toward said second position, sensor means for detecting when said valve member approaches said second position, spring biasing means coupled to said valve member for urging the latter toward said valve seat, a follower member disposed in coaxial relationship to said valve member in a passage in said valve body located on the opposite side of said valve seat from said valve member, said follower member having a leading end that is constructed to engage said valve member through said valve seat, said follower member having a trailing end that is opposite said leading end which trailing end is positionable toward and away from said sensor means, and a second spring biasing means coupled between said valve body and said follower member for urging the latter against said valve member, said second spring biasing means having a smaller spring constant than said first biasing means, whereby leaks in any fluid circuit coupled to said outlet port which leaks exceed the flow capacity through said restricted opening will cause said valve member to move towards said second position and activate said sensor means.

* * * * *